United States Patent [19]

Conway

[11] 4,260,877
[45] Apr. 7, 1981

[54] AREA MEASURING APPARATUS FOR ATTACHMENT TO A LINEAR CONVEYOR

[76] Inventor: Daniel E. Conway, 1514 Edgewood S.E., Grand Rapids, Mich. 49506

[21] Appl. No.: 950,835

[22] Filed: Oct. 12, 1978

[51] Int. Cl.³ .............................................. G01B 5/26
[52] U.S. Cl. ................................ 235/92 DN; 33/124; 209/519
[58] Field of Search ........ 235/92 DN, 92 SA, 92 NT; 356/379; 33/121–124; 198/502; 73/65; 271/109, 262; 209/517–521

[56] References Cited
U.S. PATENT DOCUMENTS

| | | | |
|---|---|---|---|
| 485,946 | 11/1892 | Kidder | 33/124 |
| 738,580 | 9/1903 | Strout | 33/124 |
| 1,704,386 | 3/1929 | Harding | 33/124 |
| 2,821,301 | 1/1958 | Montague | 209/517 |
| 2,885,787 | 5/1959 | Gray et al. | 33/174 R |
| 3,406,601 | 10/1968 | Clifford | 83/72 |
| 3,516,539 | 6/1970 | Gulstrom et al. | 209/519 |
| 3,717,414 | 2/1973 | Hall et al. | 33/123 |
| 3,899,831 | 8/1975 | DeLeon | 33/141 B |
| 4,012,943 | 3/1977 | Goffe et al. | 33/121 |
| 4,149,318 | 4/1979 | Schaaf | 33/129 |

*Primary Examiner*—Leo H. Boudreau

*Attorney, Agent, or Firm*—Price, Heneveld, Huizenga & Cooper

[57] ABSTRACT

An area measuring attachment for a linear conveyor is disclosed. The device is particularly adapted for area measurement of long, narrow objects having an irregular height and angular orientation, for example lumber, and particularly rough-cut lumber. The device includes an array of independently suspended, generally vertically oriented, freely rotating wheels. The wheels are equally spaced in a direction transverse to the direction of travel of the conveyor. Frictional contact between the wheels and the objects passing on the conveyor define the width and length of the objects. The wheels are pivotable about a first axis, generally transverse to the direction of travel of the conveyor, for accommodating objects having a warp or an irregular height. The wheels are also pivotable about a second axis, generally parallel to the direction of travel of the conveyor, for accommodating objects having irregular angular orientations. The wheels, in conjunction with their suspension apparatus, are adapted to produce electrical pulses representative of wheel rotation, and digital electronics are included for counting such pulses and generating an output in terms representative of the area or board footage of the objects passing on the conveyor.

22 Claims, 9 Drawing Figures

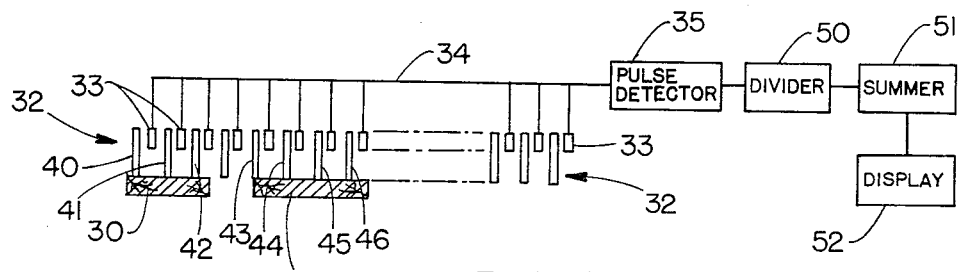
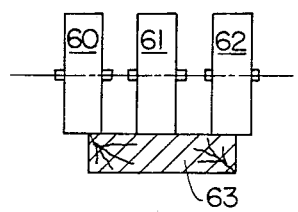
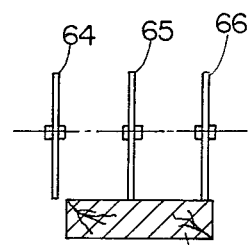
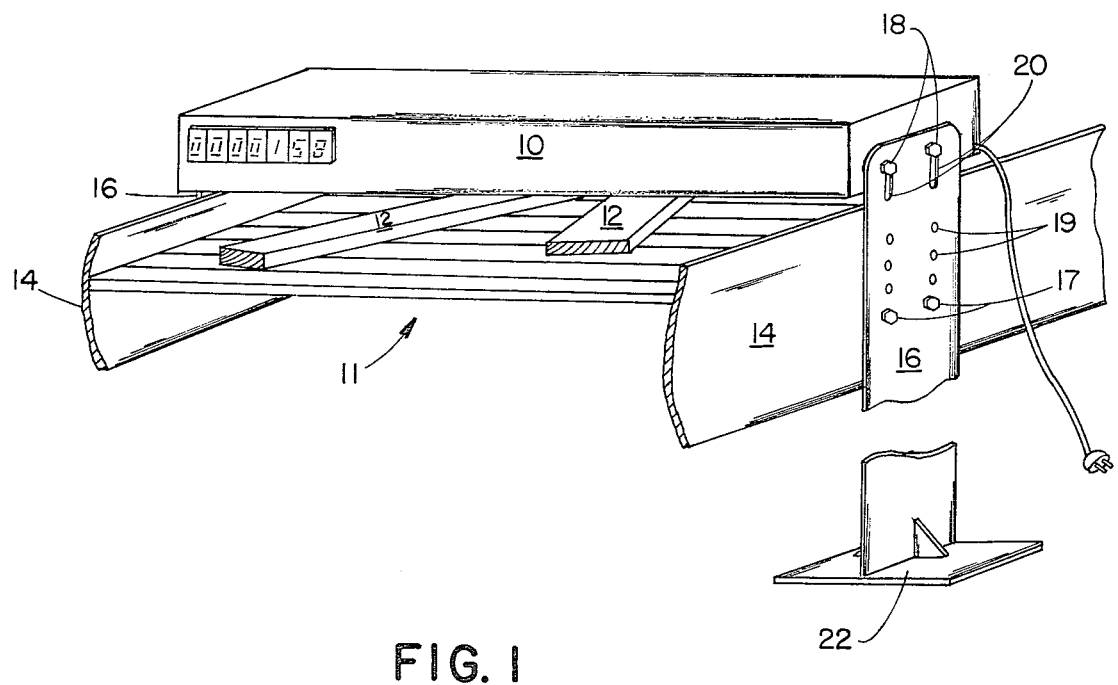

AREA MEASURING APPARATUS FOR ATTACHMENT TO A LINEAR CONVEYOR

BACKGROUND OF THE INVENTION

The invention relates generally to area measuring apparatus. In particular the invention is directed to a portable area measuring attachment for a linear conveyor that is specifically adapted for measuring the area of long, narrow objects having an irregular height, warp and angular orientation.

Prior art area measuring apparatus, and in particular, lumber area measuring apparatus have generally been exceptionally complex and costly devices comprised of gear trains, motors, drive mechanisms, escapements, cone-shaped rollers, elaborate sensing arrays deployed over large areas and the like. The complexity of these devices is at least partially due to some inherent difficulties encountered in the area measurement of lumber. These difficulties include the fact that the lumber may be warped and may have significant height or thickness variation. Another problem inherent with the area measurement of lumber is that the lumber is normally conveyed longitudinally, and longitudinal scanning of relatively long narrow objects presents a relatively high statistical error. This statistical error and the inability of prior art lumber measuring devices to accurately scan lumber skewed at irregular, angular orientations led to the development of mechanical arrangements for uniformly orienting the lumber either transversely or longitudinally to simplify and increase the accuracy of the scanning process. These mechanical arrangements for orienting the lumber further increased the complexity and the cost of prior art area measuring apparatus and resulted in area measuring apparatus that had to be built into specially modified conveyors rather than being added to existing equipment. Consequently, prior art devices for area measurement of lumber have never achieved wide acceptance in the marketplace and wood products are still almost always measured in a manual fashion, if at all.

Area measuring apparatus of the type employing an array of length and width measuring wheels and means for counting the rotation of the wheels are found in the prior art. However, these devices are almost uniformly used for the area measurement of leather, paper, cloth, or the like. These prior art measuring devices are ill-suited for use in the area measurement of lumber since they exhibit an upwardly biased statistical error when used to measure long narrow objects longitudinally, or end to end. Furthermore, these prior art area measuring devices employing an array of width and length measuring wheels are ill-suited for measuring lumber approaching the array in irregular, angular orientations. The problem is that lumber approaching the wheel array at a skewed angle can generate side thrusts that damage the wheels. Because of this statistical error and the problem with side thrust generated by lumber approaching at a skewed angle, practical prior art lumber area measuring devices employing an array of width and length measuring wheels have always been used in combination with some mechanical means for uniformly orienting the lumber, usually in a direction transverse to the flow of the conveyor. Another problem encountered when attempting to use prior art area measuring devices employing an array of wheels to measure lumber, is that these prior art wheel arrays are suspended with such limited flexibility and wheel travel as to be unable to accommodate or accurately track lumber having a warp and significant height or thickness variation. Additionally, prior art measuring devices employing an array of width and length measuring wheels are all built-in arrangements employing a specially modified conveyor.

Digital electronics have been used in the past in combination with a length measuring friction wheel and means for generating electrical pulses upon rotation of the wheel, but again, these prior art measuring devices have been embodied in complex built-in area measuring devices. Digital electronics and means for generating electrical pulses in combination with an array of friction driven wheels have not been used to provide a portable self-contained area measuring device that solves many of the specific problems involved in the area measurement of lumber travelling on a linear conveyor.

SUMMARY OF THE INVENTION

These and other problems in the prior art are solved by the present invention with a portable area measuring attachment which is installed above a linear conveyor or machine wherein long narrow objects, such as lumber or the like, pass longitudinally. As the objects pass on the conveyor, an array of independently suspended, freely rotating wheels define the length and width of the objects. The wheels are pivotable about a first axis, generally transverse to the direction of travel of the conveyor, and in this manner the wheels are gravity biased into engagement with the objects passing on the conveyor. Pivoting of the wheels about this first axis accommodates objects having a warp and/or an irregular height or thickness. To accommodate lumber having an irregular angular orientation the wheels are also pivotable about a second axis, generally parallel to the direction of travel of the conveyor. Pivoting of the wheels about this second axis accommodates objects having irregular angular orientations by allowing the wheels to yield to the side thrust generated by these objects. The wheels are preferably spring biased in a generally vertical orientation.

Improved statistical accuracy is provided by providing wheels having a circumference somewhat larger than the unit of length to be measured by each wheel to thereby offset the inherent upward bias of wheel width-measuring devices encountering long narrow objects. The device functions whether or not the objects measured are singles or multiples of any number under the wheels. The device is limited only by the width and number of wheels of the particular embodiment.

The device further includes digital electronics for counting the rotation of the wheels and generating an output representative of the area of the objects passing on the conveyor e.g., in terms of board footage where lumber is being monitored. As the wheels are individually turned by frictional contact with the objects passing on the conveyor, an extremely fast electrical pulse is generated for each rotation or each increment of rotation of the wheels. The electrical pulses generated by each width and length measuring wheel are directed to a common bus where a pulse detector separates and amplifies the pulses. The output of the pulse detector is directed to a divider which divides the number of pulses by an appropriate factor which is a function of the number of pulses generated per rotation of the wheels, the circumference of the wheels, and the transverse spacing of the wheels. The divider may also be used to compensate for statistical errors. The divider may also be selectively choosen to provide different counts for various thicknesses. The output of the divider is directed to a summer which compiles a summation of the output pulses generated by the divider. A digital display is included for displaying the summation of the output of the divider which is representative of the area (e.g., board footage) of the objects passing on the conveyor.

BRIEF DESCRIPTION OF THE DRAWINGS

FIG. 1 is a perspective view of an area measuring apparatus constructed according to the present invention installed on a linear conveyor;

FIG. 2 is a schematic representation of the electrical components of an area measuring apparatus constructed according to the present invention;

FIG. 3 is an end view of the wheel array of an area measuring device wherein the ratio of the width of the wheels to the transverse spacing of the wheels is unfavorable and produces a large upwardly biased statistical error;

FIG. 4 is an end view of the wheel array of an area measuring device having a good wheel width to transverse spacing ratio;

DESCRIPTION OF THE PREFERRED EMBODIMENTS

Figure 6:
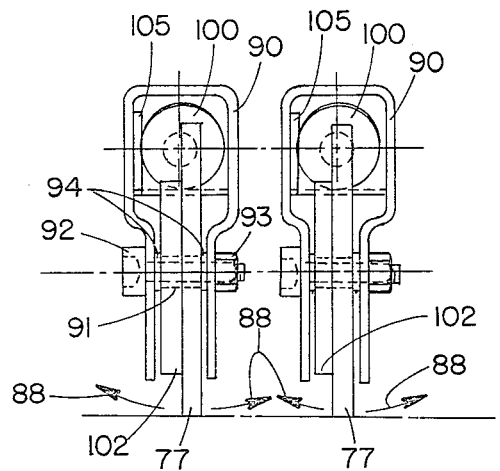
FIG. 6 is a view of two of the wheels of the wheel array of the present invention taken along line VI—VI in FIG. 5.

Referring now to FIG. 1, a perspective view of the area measuring apparatus of the present invention is illustrated. The area measuring apparatus 10 extends transversely across a linear conveyor generally indicated by the numeral 11. In this case, the conveyor 11 is illustrated as having a plurality of long narrow objects such as lumber 12 passing longitudinally thereon. Normally the lumber 12 will be skewed at various angular orientations and will contain significant height or thickness variations and warp which will make the job of area measurement much more difficult.

In this case, the area measuring device 10 is connected to the sides 14 of the linear conveyor 11 by a pair of support brackets 16. The support brackets 16 are bolted to the sides 14 of the linear conveyor 11 and to the area measuring device 10 by pairs of bolts 17 and 18, respectively. Height adjustment of the area measuring device 10 may be achieved by placing the bolts 17 through various pairs of openings 19 spaced along the length of support brackets 16. More precise height adjustment of the area measuring device 10 may be achieved by moving the bolts 18 up and down in a pair of slots 20 provided in the top of the support brackets 16. Alternately, the support brackets 16 may not be connected to the sides 14 of linear conveyor 11 but may be lengthened to extend to a supporting base such as the one illustrated at 22. This supporting base 22 may simply rest on the floor or may be secured thereto by bolts or the like. The supporting base 22 may also include means for adjusting the height of the area measuring device 10.

Referring now to FIG. 2, a schematic representation of the area measuring device of the present invention is illustrated. The objects being measured are shown in longitudinal cross section at 30 and 31. An array of independently suspended freely rotating wheels, the wheels being equally spaced in a direction transverse to the direction of travel of the conveyor are illustrated at 32. As the objects 30 and 31 proceed beneath the wheels 32, the wheels in frictional contact with the objects 30 and 31 produce a plurality of electrical pulses proportional to the rotation of each wheel. Means for generating electrical pulses associated with each of the wheels is schematically illustrated at 33. In preferred embodiments each of the means for generating electrical pulses 33 comprises a magnetic reed switch which is actuated by a magnet incorporated in each of the wheels. Other types of sensors suitable for use with the present invention for example include a photoelectric sensor used in conjunction with a light source, and a chopper wheel. In either case, the sensors 33 are provided with appropriate individual electronics so that the sensors provide electrical pulses of extremely short duration, for example, on the order of 200 nanoseconds. This serves to almost completely eliminate the possibility of overlapping pulses. This is an important feature since rather than collecting length and width information in a more complex parallel fashion, each of the sensors 33 is connected to a common bus 44 so that electrical pulses representative of the length and width of the lumber are fed in a serial manner to a pulse detector 35.

As the objects 30 and 31 proceed beneath the wheel array 32, wheels 40, 41, and 42 contact object 30 and wheels 43, 44, 45, and 46 contact object 31. The sensors associated with each wheel produce independent electrical pulses for each revolution, each wheel thus defining the length and width of the objects 30 and 31. One pulse for each unit of length and each unit of width is generated on the common bus 34. The pulse detector 35 contains appropriate digital electronics for detecting the pulses on common bus 34 and generating an output comprised of amplified and separated output pulses equal in number to the pulses received by the common bus 34. The output of the pulse detector 35 is directed to a divider 50 which divides the output of pulse detector 35 by a factor which is a function of the number of pulses generated per rotation of each wheel, the circumference of each wheel, the transverse spacing of the wheels, the desired area unit output and in some cases, the expected statistical error. Thus, the output of divider 50 is a plurality of output pulses reduced in number by a predetermined factor from the number of pulses generated by pulse detector 35. For example, assuming that one electrical pulse is generated for each rotation of the wheels in wheel array 32, that the effective circumference of each wheel is one foot and that the distance between the wheels is one inch, then division of the pulses by 12 would produce square feet.

The particular divider used can also be selected so as to divide by various other factors, and a series of specifically different dividers may be connected in the circuit by switches, so that the readout is changeable by operator selection, so as to allow readings corresponding to various units, under various conditions. For example, for one inch thick lumber, the above described division would allow the readings to be in board feet; for two inch thick lumber, an additional division by two gives board feet, and for three inch thick lumber an additional division by three gives board feet, etc. A summation of the output pulses generated by the divider 50 is compiled by a summer 51. A digital display 52 continuously displays the summation compiled by summer 51 which is representative of the total area or board feet of objects passing under the wheel array 32.

The success of this invention in measuring lumber or other long and narrow objects is partially due to the thickness and spacing of the wheels of wheel array 32 as can be shown in a simple analysis assisted by FIGS. 3 and 4. In measuring relatively narrow objects, thickness and spacing of the wheels can produce a substantial upwardly biased statistical error as illustrated by the extreme case shown in FIG. 3. In FIG. 3, the three wheels 60, 61, and 62 are depicted as having a width of approximately one-half inch and a transverse spacing of approximately one inch. Thus, if an object 63 were being measured, the width of the object 63 being approximately two inches, all three wheels would be contacted, giving a reading of three inches of width and producing an unacceptable error of 50%. This figure probably represents an average error since it is possible in this example for three inches of width to be detected with an object as narrow as one and one-half inches, producing a maximum error of approximately 100%. By reducing the wheel width to approximately one eighth of an inch, as illustrated in FIG. 4, the error is significantly reduced. In FIG. 4, the wheels 65, 66, and 67 are again transversely spaced on one inch centers. However, in this case, the object 68 would have to be one and fifteen sixteenths inches wide before three inches of width could be detected. Thus the maximum error possible in the arrangement of FIG. 4 is approximately 55%. Since the arrangement of FIG. 4 can produce a reduction in maximum possible error of approximately 50% over the arrangement of FIG. 3 a very narrow wheel relative to the spacing of the wheels is therefore to be judged critical in the measurement of long and narrow objects such as lumber.

As the width of the object in relation to the wheel spacing increases, more wheels come into play and the error caused by the incremental wheel being activated diminishes greatly. For wide objects, with many wheels being activated, the error becomes negligible, but for narrow objects with very few wheels being activated the error can be significant. Thus, in order to utilize relatively few wheels of a practical size to measure relatively narrow objects, it is important to provide some additional compensation for the upwardly biased statistical error inherent to this type of area measuring device. In the present case, this object is expediently accomplished by designing the wheels with a circumference slightly larger than the circumference associated with the unit of length being measured. This upward deviation from the unit of length being measured causes a slightly shorter than normal length to be read, thereby compensating for the upward error that has been shown to occur in the width measurement. In other embodiments, the divider 50 may divide the number of pulses produced by pulse detector 35 by a factor which is at least to some degree a factor of the expected upward statistical bias to be encountered. The degree of this modification of the circumference of the wheel or the modification of the division factor of divider 50 is dependent on the expected average width to be measured and is determined statistically.

Figure 5:
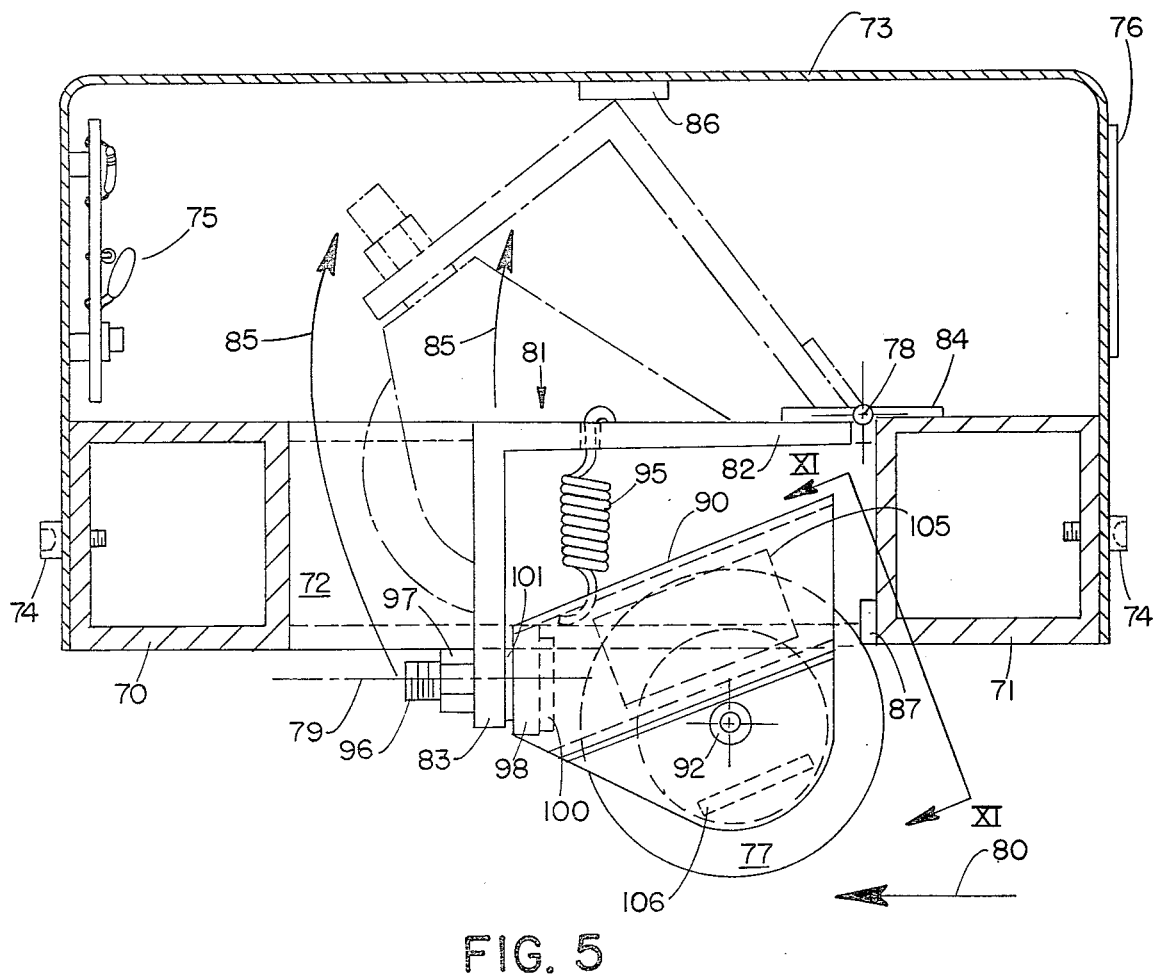
FIG. 5 is an end view partially in section of an area measuring device constructed according to the present invention.

Referring now to FIGS. 5 and 6, the mechanical structure of one embodiment of the area measuring device of the present invention is illustrated in more detail. The stationary support for the wheel array of the present invention is basically comprised of transversely extending beams 70 and 71 and longitudinally extending beams such as the one illustrated at 72. Both the transverse and the longitudinally extending beams are preferably made from steel stock, box-shaped in cross section. The longitudinal beams such as the one illustrated at 72 are welded or similarly attached across the ends of the transverse beams 70 and 71 to provide a rectangular primary load supporting structure. A sheet metal or plastic shell 73 is attached to the longitudinal and transverse beams by fasteners 74 or the like. The shell 73 supports a main electronics board at 75 and the digital display at 76.

The longitudinal beam 71 also supports means for pivoting the wheels 77 about first and second generally orthogonal axis 78 and 79. The wheels are pivoted about first and second generally orthogonal axes to accommodate objects such as lumber having a warp and irregular height and angular orientation. The direction of travel of the lumber on the conveyor is perpendicular to transverse extending beams 70 and 71 and is generally indicated by the arrow at 80.

The first axis 78 extends in a direction generally transverse to the direction of travel of the conveyor. First means for pivoting the wheels is provided for pivoting the wheels about the transversely extending axis 78. The first means for pivoting the wheels comprises a plurality of generally L-shaped support members 81 having generally horizontal and vertically extending ends 82 and 83 respectively. The horizontal end 82 of each of the support members 81 is journaled in the stationary support beam 71, about transversely extending axis 78, by a hinge or the like such as the one illustrated at 84. The opposite end, or the generally vertically extending end, 83 of the L-shaped support member 81 is adapted for supporting one of the wheels 77. The wheels 77 are thereby gravity biased into engagement with objects passing on the conveyor. In this manner, the wheels 77 may rise or fall along the arcs generally indicated by the numerals 85 to accurately track or accommodate objects such as lumber having irregular height or thickness and warp.

An upper rubber stop 86 mounted on the shell 73 limits the upward movement of the wheels 77 through interference with L-shaped support member 81. The phantom lines in FIG. 5 illustrate the wheels 77 and the L-shaped support member 81 at their upper limit of travel. The lower limit of travel is defined by lower rubber stop 87 which also serves as a wheel brake. The lower stop 87 acts as a wheel brake while simultaneously defining the lower limit of travel of wheel 77 by engaging the wheel 77 at its lower limit of travel and preventing further rotation. This prevents free wheeling of the wheel 77 after an object has passed on the conveyor and erroneous area measurements resulting therefrom.

The device further includes second means for pivoting the wheels 77 about an axis 79 that extends generally parallel to the direction of travel of the conveyor. The second means for pivoting the wheels about the axis 79 is provided for accommodating long narrow objects approaching at a skewed angle or an irregular angular orientation. As best illustrated in FIG. 6, this allows the wheels 77 to pivot from side to side, as indicated by the arrows 88. Objects approaching at irregular orientations can cause side thrusts on the downwardly extending generally vertically oriented wheels 77 when the sides of longitudinally moving objects gradually come into contact with a wheel that was not initially lifted by the front of the object. Since the side of the longitudinally moving object may be disposed at an acute angle with respect to the wheels it may not be possible for the wheels to climb up the side of the object and track along its top surface. Once a wheel is so trapped sliding along the side of a skewed object, significant side thrusts are generated that may severely damage the wheels or their pivoting assemblies. By providing a means for pivoting the wheels from side to side, as indicated by the arrows 88, the wheels simply yield to objects approaching at irregular angular orientations. This feature is particularly important in the area of measurement of lumber where relatively long narrow objects with significant thickness variation and warp may be approaching the wheels at irregular angular orientations. Because lumber has significant thickness variation or warp, the vertical travel of the wheels must be great. Providing a wheel assembly with greater vertical travel exposes a greater portion of the wheels 77 below the stationary support 71. This increases the difficulty encountered by the wheels in tracking up the side of a piece of lumber approaching at an acute angle and therefore increases the occurrence and amount of side thrust. Thus, providing means for pivoting the wheels 77 about the generally longitudinally extending axis 79, serves a particularly important function in the area measurement of lumber.

The means for pivoting the wheels 77 about the generally longitudinally extending axis 79 comprises a plurality of generally U-shaped carriers 90 which are each journaled in one of the generally vertically extending ends 83 of the pivoting support members 81. Each wheel 77 includes a bushing 91 so that the wheels 77 may be journaled in U-shaped carriers 90 by bolts and nuts 92 and 93, respectively. Polished washers 94 separate opposite sides of the wheels 77 and the generally U-shaped carrier 90. The means for pivoting the wheels 77 about the generally longitudinally extending axis 79 further includes a spring 95 interconnecting the top of each U-shaped carrier 90 and the horizontally extending end 82 of L-shaped support member 81 so that the wheels 77 are spring biased into a generally vertical orientation. The U-shaped carriers 90 are journaled in the generally vertically extending ends 83 of the L-shaped support members 81 by bolt 96, secured by a nut 97. The bolt 96 extends through generally vertically extending rear wall portions 98 of the U-shaped carriers 90. The rear wall portions 98 of U-shaped carriers 90 are normally welded to the rear of the U-shaped carriers. The rear wall portions 98 are provided with a centrally located aperture through which the bolt 96 extends. The head 100 of bolt 96 traps the rear wall portions 98 against a polished washer 101 and the generally vertically extending portion 83 of the L-shaped support member 81. U-shaped carriers 90 are therefore said to be journaled or pivotable about end 83 of the L-shaped support members 81.

As best illustrated in FIG. 6, each of the wheels 77 is provided with a step 102. The step 102 may be provided with a one piece molded or machined construction or with two annular discs journaled face to face in the U-shaped carriers 90. The importance of the step construction lies in the fact that the ends of the wheels 77 must be as thin as possible relative to the transverse spacing of the wheels to insure accuracy when measuring the area of long narrow objects, as previously discussed. However, since the wheels 77 must also withstand significant side thrust from lumber or other objects approaching at irregular angular orientations there is a practical limit on how thin the wheels 77 can be made. Provision of the step construction illustrated in FIG. 6 provides a frictional surface for contact with the objects passing on the conveyor that is as thin as possible while still providing sufficient strength to withstand side thrust imposed by objects passing on the conveyor at irregular orientations.

The U-shaped carriers 90 also carry an electronics board at 105 upon which the sensors and associated pulse electronics may be mounted. In preferred embodiments, the board 105 will carry reed switch and pulse electronics that are activated to generate a pulse upon each rotation of the wheel 77 by a passage of a magnet 106 mounted on the stepped portion of each wheel.

Figures 7, 8:
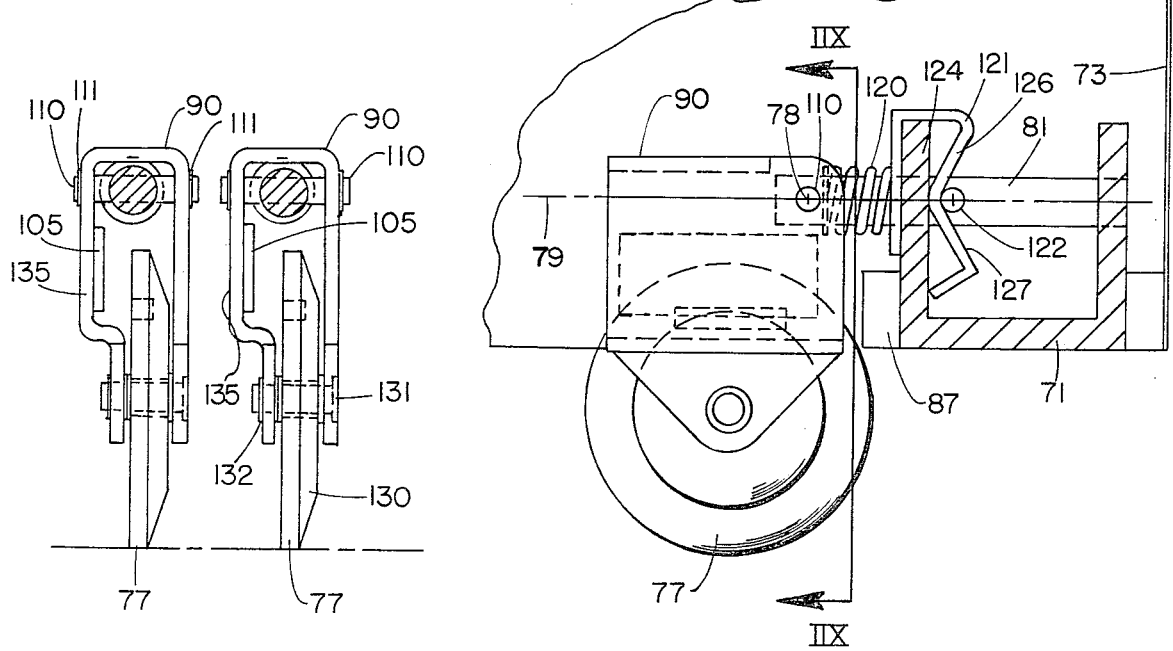
FIG. 7 is an end view partially in section of the wheel array of an area measuring device constructed according to the present invention.
FIG. 8 is a view of two of the wheels of the wheel array of the present invention taken along line IIX—IIX of FIG. 7.

Referring now to FIGS. 7 and 8, another embodiment of the area measuring device of the present invention is illustrated. Many of the components illustrated in the embodiments of FIGS. 7 and 8 serve the same, or a similar function as those components of the embodiments of FIGS. 5 and 6 and like components are given the same numeral designation. In this case, a support member or post 81 is journaled in support beam 71. The post 81 is slidably and rotatably received in the support beam 71. One post, such as the post 81, is provided for each wheel 77. The posts are disposed parallel to the second axis 79. A pin 110 is disposed on each of the posts 81 and the wheel carriers 90 are pivotable about the pins 110. The carriers 90 are secured to the pins 110 by circlips 111 disposed on opposite ends of the pins 110. The pins 110 are normally aligned parallel to the second axis 78, and in this manner, the wheels 77 are pivotable about first and second axes 78 and 79.

In this case, means for spring biasing the wheels 77 in a generally vertical direction is provided, comprising a coil spring 120 compressed between each of the pins 110 and the support beam 71, a cam 121 mounted on the support beam 71 and a cam follower 122 disposed on each post 81. In this case, the cam 121 is a strip of sheet metal bent to create a V-shaped cam surface. The cam 121 includes apertures for pinning the cam 121 to support 71 with post 81. Pressure from spring 120 and interference between the cam 121 and the top surface 124 of support beam 71 cooperate with the apertures in the cam 121 to securely locate the cam 121 on the pin 81 and the support beam 71. The cam follower 122 comprises a second pin disposed on the post 81, the second pin extending generally parallel to the first axis 79. Since the post 81 is both slidably and rotatably received in support 71, the pin 122 will slidably engage the converging surfaces 126 and 127 of the V-shaped cam 121. However, pressure from spring 120 will tend to center the pin 122 at the apex of converging cam surfaces 126 and 127, effectively spring biasing the carrier 90 and the wheel 77 into a generally vertical orientation.

Referring now specifically to FIG. 8, it is illustrated that the wheels 77 are provided with a machined bevel 130 to provide a narrow area measuring surface while still providing sufficient strength to withstand side thrusts. The wheels 77 are rotatably pinned to the carriers 90 by an axle 131 inserted through one end of the generally U-shaped carriers 90 and secured to the other end with a circlip 132. The carriers 90 are advantageously formed from sheet metal with an enlarged area adjacent sidewalls 135 to accommodate the electronics board 105 incorporating appropriate pulse generation circuitry.

Figure 9:
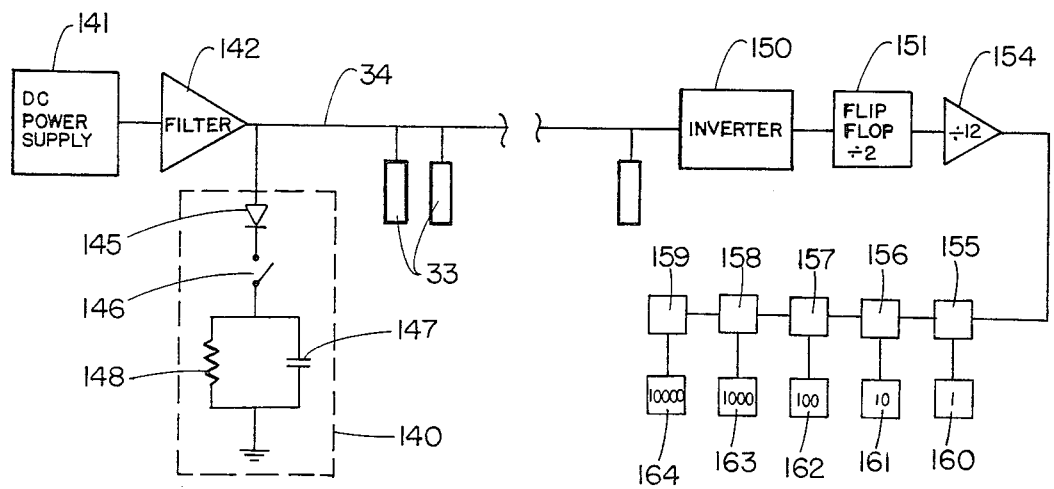
FIG. 9 is a schematic representation of the electrical components of an area measuring apparatus constructed according to the present invention.

Referring now to FIG. 9, a schematic representation of a specific electric circuit for generating pulses due to the rotation of the wheels 77 and calculating the area of objects passing thereunder is illustrated. The means for generating electrical pulses associated with each of the wheels 77 comprises the circuit located within dotted lines 140. The circuit illustrated within dotted lines 140 is mounted on the circuit board 105, best illustrated in FIGS. 6 and 8. A plurality of such circuits are connected in parallel to common bus 34 as indicated by the block diagrams 33. One such circuit is provided for each wheel. These circuits cooperate with a DC power supply 141 connected to common bus 34 with line filter 142 serially connected therebetween. The DC power supply 141 supplies an appropriate DC voltage to compliment pulse counting circuitry also connected to common bus 34.

Specifically referring now to the pulse generating circuitry within the block 140, a diode 145 and reed switch 146 are serially connected to the common bus 34. A capacitance 147 is serially connected between one terminal of the reed switch 146 and ground. A bleed resistor 148 is connected in parallel across capacitor 147. This circuit generates a negative spike on common bus 34 each time the magnet rotating on each wheel 77 causes reed switch 146 to close. The negative spike or pulse is generated on common bus 34 by the instantaneous initial charging current of capacitor 147. The negative pulse or spike is of an extremely short duration since althrough the initial charging current of the capacitor is infinity, this charging current exponentially drops to zero. Thus, although the reed switch 146 may remain closed for an indefinite time, only one short negative spike of approximately 200 nanoseconds is created when the switch 146 closes. Upon opening of the switch 146, bleed resistor 148 discharges the capacitor 147 to ground.

The extremely short duration negative pulses may be compiled to generate data representative of the area of the objects passing under the area measuring device with standard TTL (transistor -transistor logic) circuitry in the manner illustrated in FIG. 9. TTL circuitry is a type of logic circuitry introduced by the Sylvania Company and now widely available commercially. Referring now specifically to FIG. 9, the output of common bus 34 comprising a plurality of extremely short negative spikes is connected to a pulse detector herein comprising an inverter 150 and a flip-flop 151. The flip-flop effectively divides the number of pulses by two. Assuming that wheels with a circumference of one foot and spaced on one inch centers are provided. The output of flip-flop 151 is supplied to a divider 154 which may alternately be a divide by six or divide by twelve counter to accommodate various thicknesses of lumber such as one inch and two inch thick lumber. The output of divider 154 is supplied to a plurality of serially arranged registers 155 through 159. Each of the registers 155 through 159 counts to ten and then resets to zero, generating one reference pulse for each ten pulses received. The contents of these serially arranged registers is visually displayed by LED arrays 160 through 164 connected thereto. Standard TTL components suitable for use with the present invention include an inverter SN7400 for use at 150, a flip-flop SN74H106 for use at 151, a divider SN7492 for use at 154 and registers SN74143 for use at 155 through 159. The entire display, including the LED arrays 160 through 164, is commercially available and is known as a DL747 display.

In the operation of the area measuring device of the present invention, the device need only be extended transversely or orthogonally to the direction of travel of objects on a linear conveyor by either attachment to the sides of the conveyor or by support from the floor below. The height of the device should then be adjusted so that the median thickness of objects to be measured raises the width and length measuring wheels to just below 50% of their vertical wheel travel. At that point, assuming that an external power source is required, upon plugging the device in, and clearing the summer, the conveyor may be run and the device will provide a continuous compilation of the total area or board feet of the objects passing under the device. Periodic height adjustment of the device may be necessary if a large average thickness or height variation in the objects to be measured is expected. In appropriate embodiments of the invention it may also be desirable to change the division factor of the divider to account for the expected upwardly biased statistical error for the average length and width of the objects being measured. In other embodiments of the invention, the division factor of the divider may also be changed to change the unit of area being compiled. For example, in some cases it may be desirable to alternately provide the ability to compile square inches, feet, yards, or similar metric equivalents.

The above description should be considered as that of the preferred embodiment only. The true spirit and scope of the present invention will be determined by reference to the appended claims and it is desired to include within the scope of the appended claims all such modifications and applications of the invention that are obvious to one of ordinary skill in the art.

The embodiment of the invention in which are exclusive property or privilege is claimed are defined as follows:

1. In an area-measuring apparatus for attachment to a linear conveyor, the apparatus being of the type having an array of length and width-measuring wheels and means for summing the rotation of the wheels, the apparatus being particularly adapted for the area measurement of long narrow objects having an irregular height and angular orientation, the improvement comprising means for pivoting each of the wheels about first and second generally orthogonal axis for accommodating objects on the conveyor having irregular heights and angular orientations, respectively.

2. In an area-measuring apparatus for attachment to a linear conveyor, the apparatus being of the type having an array of length and width-measuring wheels and means for counting the rotation of the wheels, the apparatus including first means for vertically displacing the wheels to accommodate objects having an irregular height, the apparatus being particularly adapted for the area measurement of long narrow objects, the improvement comprising second means for pivoting each of the wheels about an axis generally parallel to the direction of travel of the conveyor, for accommodating objects having irregular angular orientations.

3. The area-measuring apparatus of claim 2 wherein said second means for pivoting the wheels further includes means for spring biasing the wheels in a generally vertical orientation.

4. An area-measuring apparatus, the apparatus being adapted for attachment to a linear conveyor for area measurement of lumber, comprising:

an array of length and width-measuring wheels;

a plurality of support members for pivoting said wheels about an axis generally transverse to the direction of travel of the conveyor, one end of each of said support members being journaled in a stationary support, the opposite end of each of said support members being adapted to support one of said wheels;

a plurality of carriers for pivoting said wheels about an axis generally parallel to the direction of travel of the conveyor, one of said wheels being journaled in each of said carriers, each of said carriers being journaled in one of said support members;

means for generating electrical pulses associated with each of said wheels, the number of pulses generated being proportional to rotation of said wheels; and means for counting electrical pulses and generating an output representative of the area of objects passing on the conveyor.

5. The area-measuring apparatus of claim 4 wherein said means for counting electric pulses comprises:

a common bus coupled to each of said means for generating electrical pulses;

a pulse detector connected to said common bus, said pulse detector generating amplified and separated output pulses equal in number to the pulses received by said common bus;

a divider connected to receive the output of said pulse detector, said divider generating output pulses reduced in number by a predetermined factor;

a summer for compiling a summation of the output pulses generated by said divider; and means for displaying the summation representing the area of lumber passing on the conveyor.

6. An area-measuring apparatus, the apparatus being adapted for attachment to a linear conveyor, comprising:

an array of independently suspended, generally vertically oriented, rotatable wheels, said wheels being equally spaced in a direction transverse to the direction of travel of the conveyor;

first means for pivoting said wheels about a first axis, said first axis extending generally transverse to the direction of travel of the conveyor, for accommodating objects having an irregular height;

second means for pivoting said wheels about a second axis, said second axis being generally orthogonal to said first axis and generally parallel to the direction of travel of the conveyor, for accommodating objects having irregular angular orientations; and means for monitoring the rotation of said wheels and generating an output representative of the area of an object rotating certain of said wheels as it passes them while moving along the conveyor.

7. The area-measuring apparatus of claim 6 wherein said means for monitoring includes means for generating electrical pulses associated with each of said wheels, the number of pulses generated being proportional to rotation of said wheels.

8. The area-measuring apparatus of claim 7 wherein the output of each of said means for generating electrical pulses is directed to a common bus.

9. The area-measuring apparatus of claim 8 wherein said means for generating electrical pulses comprises:

a switch associated with each of said wheels, said switches being actuated by rotation of said wheels, each of said switches being connected in parallel to said common bus;

a capacitor in series with each of said switches and ground; and a DC power supply connected to said common bus.

10. The area-measuring apparatus of claim 9 wherein said means for generating electrical pulses further includes:

a diode connected in series with said capacitor and disposed between said common bus and said capacitor; and a bleed resistor connected in parallel with said capacitor.

11. The area-measuring apparatus of claim 8 wherein said means for monitoring further includes a pulse detector connected to said common bus, said pulse detector generating an output representative of the total number of pulses received by said common bus.

12. The area-measuring apparatus of claim 11 wherein said means for monitoring further includes a divider, said divider connected to receive the output of said pulse detector, said divider generating output pulses reduced in number by a factor defined by the number of pulses counted per rotation by said means for generating electrical pulses and by the circumference and transverse spacing of said wheels.

13. The area-measuring apparatus of claim 12 wherein said means for monitoring further includes a summer for compiling a summation of the output pulses generated by said divider.

14. The area-measuring apparatus of claim 13 wherein said means for monitoring further includes a digital display for displaying the summation of the output of said divider, the summation being equal to the area of the objects passing on the conveyor.

15. The area-measuring apparatus of claim 7 wherein said means for generating electrical pulses comprises:

a magnet carried by each of said wheels; and a magnetically actuable switch adjacent to each of said wheels, said switch closing briefly to generate an electrical pulse of short duration for each rotation of said wheels.

16. The area-measuring apparatus of claim 6 wherein said first means for pivoting said wheels comprises;

a stationary support structure extending transversely across the conveyor; and a plurality of generally L-shaped support members, one end of each of said support members being journaled in said stationary support, the opposite end of each of said support members extending downward and being adapted to support one of said wheels, said wheels thereby being gravity biased into engagement with objects passing on the conveyor.

17. The area-measuring apparatus of claim 16 wherein said second means for pivoting said wheels comprises:

a plurality of generally U-shaped carriers one of said wheels being journaled in each of said carriers;

said carriers being journaled in the downward extending ends of said L-shaped support members; and means for spring biasing said wheels in a generally vertical orientation.

18. The area-measuring apparatus of claim 6 wherein said first and second means for pivoting said wheels comprises:
- a stationary support structure extending transversely across said conveyor;
- a plurality of posts disposed parallel to said second axis, said posts being journaled in said support structure;
- a pin disposed on each of said posts said pins being disposed parallel to said first axis; and
- a wheel carrier pivotable about each of said pins.

19. The area-measuring apparatus of claim 18 further including means for spring biasing said wheels in a generally vertical direction comprising:
- a coil spring compressed between each of said pins and said support structure;
- said posts being slidably and rotatably received by said support structure;
- a cam follower disposed on each of said parts; and
- a cam surface cooperating with each of said cam followers to spring bias said wheels in a generally vertical direction.

20. The area-measuring apparatus of claim 6 wherein said wheels are provided with a width much smaller than the transverse spacing of said wheels, whereby error due to wheel overlap on narrow objects is minimized.

21. The area-measuring apparatus of claim 6 wherein said wheels are provided with a circumference larger than the unit of length to be measured by each rotation of said wheels to compensate for error resulting from wheel overlap on narrow objects.

22. The area-measuring apparatus of claim 6 further including stop means for braking further rotation of said wheels when said wheels are no longer in contact with an object on a conveyor, thereby minimizing error due to free-wheeling of said wheels.

* * * * *